April 12, 1938.    C. W. KETTRON    2,113,918
OUTLET BOX CONSTRUCTION
Filed Oct. 24, 1936
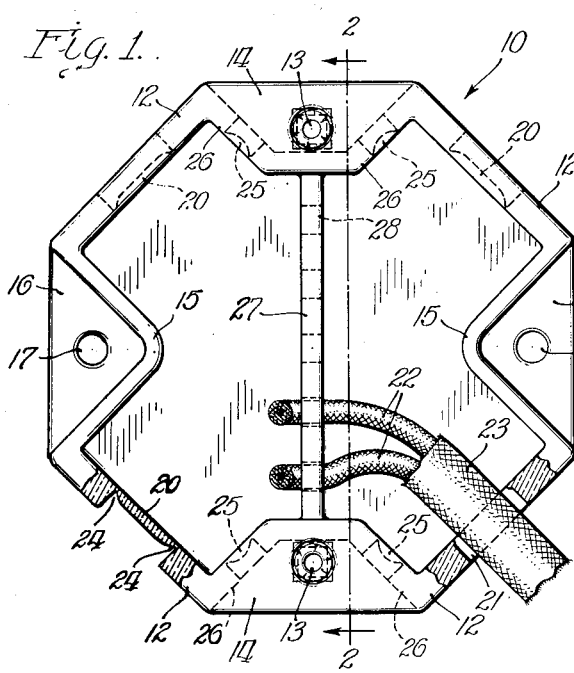
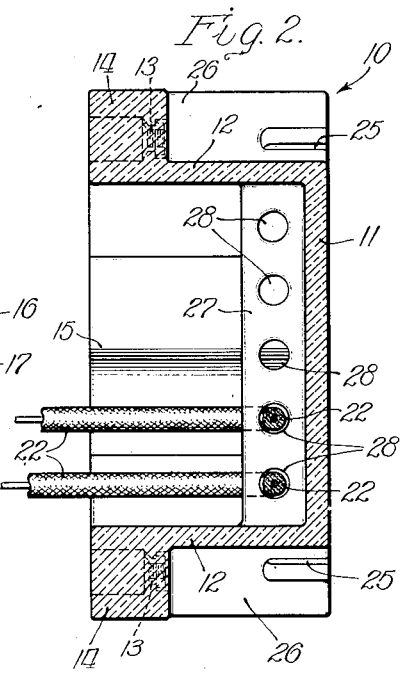
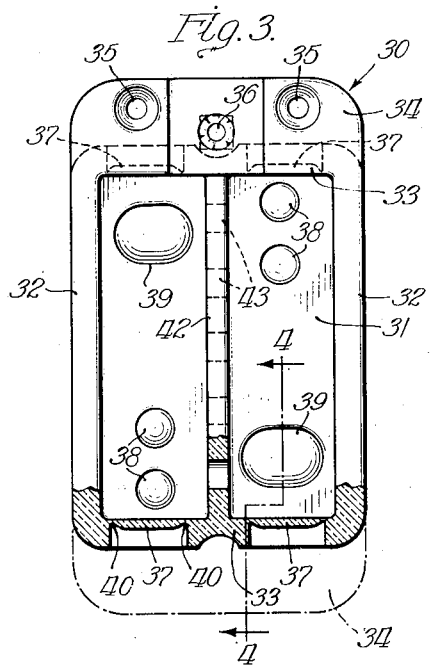
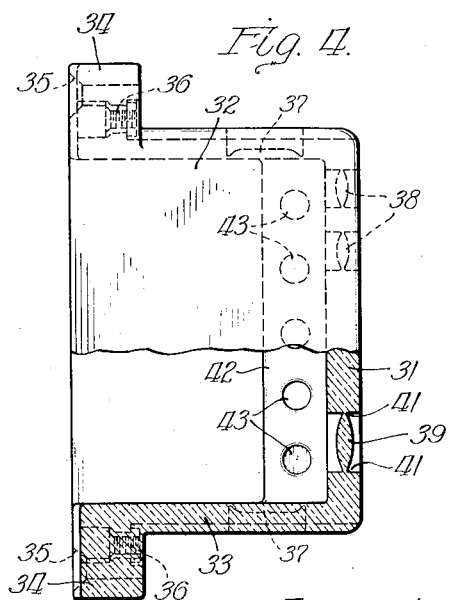
Inventor:
Charles W. Kettron Patented Apr. 12, 1938

2,113,918

UNITED STATES PATENT OFFICE 2,113,918

OUTLET BOX CONSTRUCTION

Charles W. Kettron, Macomb, Ill., assignor to Illinois Electric Porcelain Company, Macomb, Ill., a corporation of Illinois Application October 24, 1936, Serial No. 107,387

8 Claims. (Cl. 247—15)

My invention relates, generally, to electric wiring devices, and it has particular relation to the construction of outlet boxes.

While it has been customary for many years to employ metal outlet boxes for electric wiring, and the use thereof is widespread, these boxes have certain undesirable characteristics. The chief disadvantage resides in the fact that the outlet box of this type is formed of metal and thereby constitutes a hazard because of the possibility of short-circuiting of one or more of the conductors to the outlet box. In some cases, defective wiring caused by such a hazard has resulted in the starting of a fire. Of course the short circuit without a resulting fire may disrupt the electrical system or cause the outlet box to be energized in such manner as to cause a severe shock to a person coming in contact with it.

In electric wiring systems, one of the chief aims is to provide adequate insulation for the conductors. This is provided, in part, by insulating materials and partly by the manner in which the conductors are disposed relative to each other and to ground. To run the conductors into a metal outlet box after taking all of the other precautions to insulate them is a somewhat contradictory procedure.

Accordingly, the object of my invention, generally stated, is to provide an outlet box of insulating material which may be readily and economically manufactured and installed.

An object of my invention is to provide for admitting electrical conductors at various positions determined by wiring conditions through the walls of an outlet box formed of ceramic material while maintaining the integrity of the remainder of the outlet box.

Another object of my invention is to provide a plurality of knock-out portions or members in one or more of the walls of an outlet box formed of ceramic material whereby electrical conductors may be drawn therethrough as best suits the particular wiring conditions where the outlet box is installed.

Still another object of my invention is to provide for retaining electrical conductors in an outlet box formed of ceramic material.

A further object of my invention is to provide for mounting an outlet box formed of ceramic material by screws, bolts, or the like, positioned in apertured openings in portions of the outlet box which do not extend beyond the dimensions of the box itself.

A specific object of my invention is to accomplish the foregoing objects by providing a porcelain outlet box having knock-out portions or members in one or more of its walls to permit insertion of electrical conductors according to wiring conditions and having an integrally formed apertured web for fastening the conductors therein.

Other objects of my invention will, in part, be obvious and in part appear hereinafter.

My invention, accordingly, is disclosed in the embodiments hereof shown in the accompanying drawing, and it comprises the features of construction, combination of elements, and arrangement of parts which will be exemplified in the constructions hereinafter set forth, and the scope of the application of which will be indicated in the appended claims.

For a more complete understanding of the nature and scope of my invention, reference may be had to the following detailed description taken in connection with the accompanying drawing, in which:

Figure 1 is a view, partly in top plan and partly in section, showing one embodiment of my novel outlet box;

Figure 2 is a sectional view, taken along the line 2—2 of Figure 1, and showing in further detail the features of construction of the outlet box there shown;

Figure 3 is a view, partly in top plan and partly in section, showing another embodiment of my invention; and Figure 4 is a view taken generally along the line 4—4 of Figure 3, showing in section certain of the details of construction of the knock-out portions or members.

Referring now particularly to Figures 1 and 2 of the drawing, it will be observed that the reference character 10 designates, generally, an outlet box suitable for supporting an electric fixture or forming a junction box in an electric wiring system, as may be desired. The outlet box 10 has a bottom wall 11 and upstanding side walls 12. The outlet box 10, in the form illustrated, is generally octagonal in shape, but it will be understood that other shapes may be employed without departing from the scope of my invention.

In order to secure a cover or an electric fixture to the outlet box 10, threaded sleeves 13 are provided in suitable openings in thickened lips 14 on opposite sides. The upper ends of the threaded sleeves 13 are headed over to secure them in position. The lower ends of the threaded sleeves 13 may take the form of nuts disposed in correspondingly shaped apertures on the underside of the lips 14 to prevent turning thereof.

With a view to providing the maximum degree of insulation in the construction of the outlet box 10, I provide for forming it entirely of a ceramic material, except for the threaded sleeves 13 which are preferably formed of metal, such as brass. The entire outlet box 10 is formed as a single unit, and it is preferably formed of porcelain. This material provides a durable construction which is impervious to moisture and to the corrosive effects of acid conditions which may exist in the vicinity of its installation. Since the entire outlet box 10 is formed of porcelain, there is no likelihood of a short-circuit being completed therethrough. Thus, even though the insulation on the conductors positioned therein should become frayed or broken, either accidentally or because of deterioration, there is no possibility that faulty circuit conditions will exist which might have harmful results such as starting a fire, blowing of fuses, or causing a condition whereby a person on contacting the box might be subjected to a shock.

It is necessary to provide some means for mounting the outlet box 10 in position on a suitable supporting member. Since the outlet box 10 is formed of porcelain, it is undesirable to provide outstanding lugs or ears with suitable apertures through which fastening means might be placed. Such outstanding lugs or ears might be broken off in handling, and therefore it is desirable to provide a different construction. For this purpose I have provided reentrant angle portions 15 on opposite sides of the outlet box 10, thereby exposing portions 16 of the bottom wall 11. If desired, the exposed portions 16 of the bottom wall 11 may be somewhat thicker than the remaining portions thereof, for structural reasons. Apertures 17 extend transversely through the exposed portions 16 of the bottom wall 11 in order to permit the insertion of screws, bolts, or the like for mounting the outlet box 10 in position. It will be observed that in this construction no lugs or ears are required which project beyond the confines of the box 10 itself. A compact structure is thereby provided which is substantially unbreakable.

Furthermore, this construction avoids the necessity of positioning metal fastening devices, such as screws or bolts, within the outlet box, as would be required if openings were provided in the bottom wall 11 for mounting it in position.

In order to provide for inserting conductors through the walls 12 of the outlet box 10, suitable apertures must be provided therein. Since it is desirable to provide for manufacturing the outlet boxes 10 on a mass production basis and, further, since it is not possible to predetermine from what direction or directions the conductors will approach and leave the outlet box 10, it is necessary to provide apertures in all of the side walls 12. However, only the apertures through which the conductors are drawn should be opened, while the remaining apertures should be closed. This has presented a difficulty in the construction of outlet boxes formed of ceramic material which has not heretofore been overcome.

According to my invention, I have provided knock-out portions or members 20 in the side walls 12 which, when removed, provide an aperture such as indicated at 21 through which a pair of conductors 22, surrounded by a flexible tube of insulation 23, may be drawn. It will be noted that the section of the knock-out portion 20 adjacent the side wall 12 is reduced as at 24. This construction provides a weakened section along which cleavage takes place without materially disturbing the adjacent inner surface of the side walls 12, as will be readily understood. As many of the knock-out portions 20 are removed as desired, merely by striking them with a screwdriver or with the end of one handle of a pair of pliers, or by any other like blunt instrument. It will be evident that the remaining knock-out portions 20 which are not removed provide for maintaining the integrity of the remaining part of the outlet box 10.

Additional knock-out portions or members 25 are provided underneath the lips 14 in the reentrant sides 26 thereunder. The knock-out portions 25 are of such size that preferably only a single insulated conductor is passed therethrough.

Certain underwriters' requirements and municipal codes require that some means be provided in outlet boxes for anchoring the electric conductors therein. This anchoring means must be entirely independent of the electrical fixture which may be mounted on or supported by the outlet box. With this purpose in mind, I have provided a web or ridge 27 extending between the opposite side walls of the outlet box 10 and integrally formed therewith and with the bottom wall 11. The web 27 is formed of porcelain, the same as the outlet box 10, and, of course, is formed as an integral piece therewith. As shown in the drawing, the web 27 is provided with transverse apertures 28 through which the conductors 22 may be positioned and turned outwardly to prevent their being readily withdrawn.

In Figures 3 and 4 of the drawing I have illustrated another embodiment of my invention, which is especially adapted for mounting flush-type wall switches and wall plugs. As there shown, an outlet box 30 is provided having a bottom wall 31, side walls 32, and end walls 33. The outlet box 30 is formed preferably of porcelain in order to provide the foregoing enumerated advantages. Outwardly extending lips 34 are provided and integrally formed with the end walls 33 with transverse apertures 35 extending therethrough to provide for mounting in the wall or other suitable supporting means as by screws, bolts, or the like. Threaded sleeves 36 are provided in suitable apertures and are similar to the threaded sleeves 13, shown in Figure 1 of the drawing, to permit mounting thereon of the electric fixture which is to be used.

With a view to providing access into the interior of the outlet box 30, knock-out portions or members 37 are provided in the end walls 33, as illustrated. Additional knock-out portions 38 and 39 are provided in the bottom wall 31. The knock-out portions 37 may be circular in shape and of such size as to permit the insertion of a pair of insulated conductors, such as those shown at 22 in Figure 1 of the drawing and encased in a tube of insulation 23. The knock-out portions 38 may be circular in shape, as indicated, and of such size as to permit the passage therethrough of only a single insulated conductor. The knock-out portions 39 are somewhat oval in shape to take care of conductors encased in insulation having this shape.

It will be observed that the knock-out portion 37 is reduced in section, as at 40, and that likewise the knock-out portion 39 is reduced in section, as at 41, along the junction line with the adjoining wall. This construction provides a distinct line of cleavage along which separation takes place when the knock-out portion is removed on being struck a sharp blow by a blunt instrument.

The knock-out portion 39 is provided substantially midway between the surfaces of the bottom wall 31, as is more clearly shown in Figure 4 of the drawing. Both sides of this knock-out portion are curved so that a distinct line of cleavage is provided on each side. When so arranged, very little, if any, of the adjoining wall portion is removed when the knock-out portion 39 is removed. If desired, of course, this same arrangement and construction could be provided for the knock-out portions 37.

With a view to providing for fastening the electric conductors inside of the outlet box 30, a web or ridge 42 is provided along the inner surface of the bottom wall 31 and between the end walls 33. The web 42 is formed of porcelain and is, of course, formed integrally with the outlet box 30. Suitable apertures 43 are provided in the web 42 to permit insertion of the conductors, as previously described, and for fastening them therein.

It will be obvious to those skilled in the art that my invention may take other forms than those specifically illustrated in the drawing and described herein. Therefore, it is intended that all matter contained in the foregoing description or shown in the accompanying drawing shall be interpreted as illustrative and not in a limiting sense.

I claim as my invention:

1. An outlet box for electric wiring comprising, in combination, a receptacle formed of ceramic material, fastening means carried by said receptacle for mounting thereon a cover or an electrical device, a plurality of knock-out portions in said receptacle to permit insertion of electric conductors at selected positions for interconnection or connection to said electrical device while maintaining the integrity of the remainder of the receptacle, and a web integrally formed with said receptacle for securing said conductors thereto.

2. An outlet box for electric wiring comprising, in combination, a porcelain receptacle having integral bottom and side walls, fastening means carried by said receptacle for mounting thereon a cover or an electrical device, a plurality of porcelain knock-out portions integrally formed in at least one of said walls to permit insertion of electric conductors at selected positions for interconnection or connection to said electrical device, and a porcelain web integrally formed with said bottom and side walls and having apertures extending therethrough for securing said conductors thereto.

3. An outlet box for electric wiring, comprising a receptacle formed of ceramic material, and a web integrally formed therewith for securing the wires thereto.

4. An outlet fox for electric wiring, comprising a receptacle formed of porcelain, and a wire retaining web having a plurality of apertures formed integrally with the bottom and side walls thereof.

5. An outlet box for electric wiring comprising, a receptacle of ceramic material having integrally formed bottom and side walls, and a reentrant angle portion in a side wall exposing a portion of said bottom wall, said exposed portion having a transverse aperture extending therethrough to permit insertion of fastening means.

6. An outlet box for electric wiring comprising, a receptacle of ceramic material having a bottom wall and side walls integrally formed therewith, said side walls being polygonal in shape, and reentrant angle portions formed in opposite corners of said side walls exposing portions of said bottom wall, said exposed bottom wall portions having apertures extending transversely therethrough to permit insertion of fastening means.

7. An outlet box for electric wiring comprising, in combination, a receptacle formed of ceramic material having bottom and side walls, threaded fastening means carried by said receptacle for mounting thereon a cover or an electrical device, a plurality of knock-out portions integrally formed with said walls to permit insertion of electric conductors at selected positions for interconnection or connection to said electrical device while maintaining the integrity of the remainder of said receptacle, and an apertured web integrally formed with said receptacle for receiving and securing thereto said conductors.

8. An outlet box for electric wiring comprising, in combination, a receptacle formed of ceramic material having bottom and side walls, threaded fastening means carried by said receptacle for mounting thereon a cover or an electrical device, a plurality of knock-out portions integrally formed with said side walls with their inner surfaces flush with and forming a continuation of the inner surfaces of said side walls to permit insertion of electric conductors at selected positions for interconnection or connection to said electrical device while maintaining the integrity of the remainder of said receptacle, and an apertured web integrally formed with said bottom and side walls for receiving and securing thereto said conductors.

CHARLES W. KETTRON.